(12) United States Patent
Iizuka (10) Patent No.: US 11,104,002 B2
(45) Date of Patent: Aug. 31, 2021

(54) ROBOT APPARATUS

(71) Applicant: CANON KABUSHIKI KAISHA, Tokyo (JP)

(72) Inventor: Shinsuke Iizuka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 16/048,056

(22) Filed: Jul. 27, 2018

(65) Prior Publication Data

US 2018/0333856 A1 Nov. 22, 2018

Related U.S. Application Data

(63) Continuation of application No. 14/733,657, filed on Jun. 8, 2015, now abandoned.

(30) Foreign Application Priority Data

Jun. 10, 2014 (JP) ................. 2014-119369

(51) Int. Cl.
*B25J 9/16* (2006.01)
*B25J 9/00* (2006.01)

(52) U.S. Cl.
CPC ........... *B25J 9/1674* (2013.01); *B25J 9/0084* (2013.01); *B25J 9/1664* (2013.01); *B25J 9/1682* (2013.01); *G05B 2219/24092* (2013.01); *Y10T 74/20305* (2015.01)

(58) Field of Classification Search
CPC ...... B25J 9/1682; B25J 9/1674; B25J 9/1664; B25J 9/0084; G05B 2219/24092; Y10T 74/20305
See application file for complete search history.

(56) References Cited

U.S. PATENT DOCUMENTS

| | | | | |
|---|---|---|---|---|
| 4,664,588 A | * | 5/1987 | Newell | B23Q 1/0063 294/86.4 |
| 5,917,428 A | * | 6/1999 | Discenzo | G01R 31/343 340/870.01 |
| 6,131,299 A | * | 10/2000 | Raab | G01B 21/04 33/503 |
| 6,212,443 B1 | * | 4/2001 | Nagata | G05B 19/423 700/245 |
| 6,297,742 B1 | * | 10/2001 | Canada | G01R 31/343 318/490 |
| 9,375,841 B1 | * | 6/2016 | Kemper | B25J 17/00 |
| 2005/0004707 A1 | * | 1/2005 | Kazi | B25J 9/1682 700/245 |

(Continued)

*Primary Examiner* — Stephen Holwerda
(74) *Attorney, Agent, or Firm* — Canon U.S.A., Inc. IP Division (57) ABSTRACT

A plurality of robot arms are each provided with indication devices that have indicators which indicate operability states of at least one other robot arm different from the robot arm on which the indication device is provided. Alternatively or in addition, the indication devices have indicators which indicate operability states of a respective robot arm upon which the indication devices are provided. Robot control devices which control operations of the robot arms communicate through a local area network (LAN) to share information regarding the states of the robot arms. Indication drive signals for the indication devices are generated based on states of servo control signals and/or brake control signals for the robot arms.

21 Claims, 8 Drawing Sheets

(56) References Cited

U.S. PATENT DOCUMENTS

| | | | | |
|---|---|---|---|---|
| 2005/0187657 A1* | 8/2005 | Hashimoto | ............. | B25J 19/00 |
| | | | | 700/245 |
| 2006/0238332 A1* | 10/2006 | Carle | .................... | G08C 17/00 |
| | | | | 340/539.1 |
| 2007/0005045 A1* | 1/2007 | Mintz | ................... | A61B 34/74 |
| | | | | 606/1 |
| 2010/0268386 A1* | 10/2010 | Kiyota | .................. | B25J 9/1674 |
| | | | | 700/264 |

* cited by examiner

ROBOT APPARATUS

CROSS-REFERENCE TO RELATED APPLICATIONS

This application is a Continuation of U.S. patent application Ser. No. 14/733,657, filed Jun. 8, 2015, which claims the benefit of Japanese Patent Application No. 2014-119369, filed Jun. 10, 2014, both of which are hereby incorporated by reference herein in their entirety.

BACKGROUND OF THE INVENTION

Field of the Invention

The present invention relates to a robot apparatus having a plurality of robot arms.

Description of the Related Art

In recent years, automation of processes for assembling an industrial product having a small and complicated structure, for example, has been highly demanded, and such products may require high speed and highly precise assembly using a small industrial robot. From a viewpoint of competitiveness over foreign production, for example, a cost-reduced production system must be constructed, and a high speed, highly precise, stable and highly productive production line has been demanded in which one robot is responsible for many assembly processes.

In some highly efficient production lines, multiple (or a plurality of) industrial robot arms may be used to precisely assemble parts each grasped by fingers of each of the arms into a part on a workbench. In order to teach a robot an assembly job in such a robot system, a plurality of teachers may sometimes be involved. For example, such a teaching work may involve an operator who operates a robot arm by using a teaching device such as a so-called teaching pendant, and an operator who visually inspects parts to monitor conditions and failure/success of an assembly job thereon. The former operator may sometimes be called a "manipulator", and the latter operator may sometimes be called a "supervisor".

A robot arm to be subjected to a teaching operation in a robot apparatus having a plurality of arms is decided based on an oral communication between the supervisor and the manipulator. A robot arm subjected to a teaching operation will be called a "decided arm" hereinafter.

In a teaching operation on a decided arm, a supervisor waits in the vicinity of the decided arm and concentrates his or her gaze and attentions on fingers of the decided arm. In this case, because a result of an operation performed on the decided arm by a manipulator is only displayed on a teaching pendant (hereinafter, called a TP), the operability state of the operation on the arm is not directly available to the supervisor.

The expression "operability state" herein refers to a state that a specific manipulation (such as a jog operation or an inching operation to be performed by using a TP) is enabled to start an operation of a robot arm immediately or not. Generally, a teaching operation may be performed on a robot arm by manipulating a TP to actually operate a robot arm from a present position/attitude to a next teaching point. Such a teaching operation may be allowed by performing a specific manipulation on a TP to shift the TP (or the entire robot system) to a mode which enables a teaching operation (teaching mode, which will be described below), for example. Alternatively, in a TP having an enable switch such as a deadman's key (switch), the enable switch may be shifted to the enable state to allow a teaching operation as a result.

For example, a mode shift or switch operation as described above may be performed to shift the robot apparatus to a mode allowing a teaching operation or a teaching mode. In the teaching mode, a servomotor drives a joint, for example, of a robot arm to shift to a so-called servo-ON state. In a case where a brake is provided which locks a motion of each joint of a robot arm, the brake of each joint is released from a locked state. The change allows the robot arm to operate in accordance with a subsequent teaching operation on a TP. In other words, the operability state in the teaching mode is an enable state while it is a disabled state in a mode excluding the teaching mode.

In the past, information exchange regarding an operability state of a robot arm between a supervisor and a manipulator may be performed through oral communication, for example. However, in this configuration and operation forms, there is a possibility that a manipulator may operate a robot arm without transmitting a signal unintentionally, resulting in a collision of a decided arm with a supervisor who does not expect the arm to move.

In view of such a situation, an indication control device has been proposed which includes an indicator configured to indicate whether an operation is possible or not on, or in the vicinity of, a robot arm (see Japanese Patent No. 3183355, for example). In a multiple-arm robot system disclosed in Japanese Patent No. 3183355, an indicator is provided on (or in the vicinity of) each of a plurality of robot arms so that the indicators may indicate whether the corresponding robot arms are possible to operate or not.

However, in the configuration of Japanese Patent No. 3183355, the operability state of a specific arm is only indicated by an indicator provided on, or in the vicinity of, the arm. Thus, in a case where an arm (hereinafter, called an undecided arm) excluding a decided arm is shifted to a teaching mode, a supervisor who concentrates on the decided arm may not notice the fact that the undecided arm has been shifted to the teaching mode.

A case will be discussed in which, after teaching a decided arm, a manipulator next shifts an undecided arm to a teaching mode to teach the undecided arm, and unintentionally does not transmit a signal that the mode of the decided arm is changed. In this situation, the configuration of Japanese Patent No. 3183355 does not allow a supervisor who concentrates on the decided arm to easily notice that the undecided arm has been changed to the teaching mode. This is because, in the configuration of Japanese Patent No. 3183355, when a manipulator shifts an undecided arm to a teaching mode, the fact that the undecided arm is in the teaching mode is indicated by an indicator on the undecided arm outside the supervisor's field of view and conscious mind. According to the indication scheme as disclosed in Japanese Patent No. 3183355, it is extremely difficult to notice that an undecided arm has been shifted into a teaching mode as far as a supervisor sometimes performs a behavior such as looking at an undecided arm.

The present invention allows indication of an operability state of a robot arm through an indicator provided on another robot arm of a plurality of robot arms in a robot apparatus.

SUMMARY OF THE INVENTION

The present invention provides a robot apparatus including a plurality of robot arms each including an indication device having a first indicator configured to indicate an operation state of at least one of the plurality of robot arms different from a respective robot arm on which each indication device is provided.

Alternatively or furthermore, according to the present invention, the indication device may have a second indicator configured to indicate a state of a robot arm where the indication device is provided.

Further features of the present invention will become apparent from the following description of embodiments with reference to the attached drawings.

BRIEF DESCRIPTION OF THE DRAWINGS

FIGS. 3A to 3D illustrate indication control in the apparatus in FIG. 1.

FIGS. 7A to 7D illustrate indication control in the apparatus in FIG. 4 to FIG. 6.

DESCRIPTION OF THE EMBODIMENTS

Aspects for embodying the present invention will be described below in detail based on illustrated embodiments. Each of the embodiments of the present invention described below can be implemented solely or as a combination of a plurality of the embodiments or features thereof where necessary or where the combination of elements or features from individual embodiments in a single embodiment is beneficial. Embodiments relating to a robot apparatus having two robot arms will be described below, but the number of robots or robot arms is not limited to two. Two or more (or a plurality of) robots or robot arms may be provided.

First Embodiment

Figure 1:
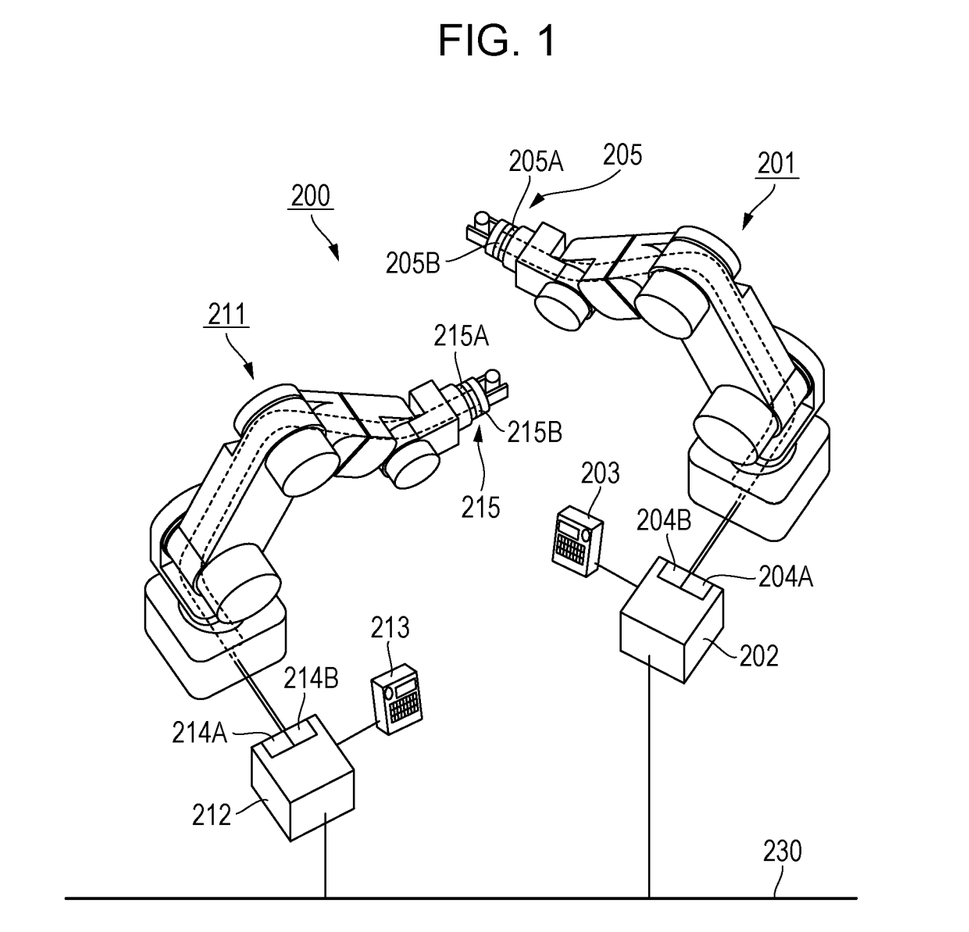
FIG. 1 is an explanatory diagram illustrating a schematic configuration of a robot apparatus according to a first embodiment applying the present invention.

FIG. 1 is a general configuration of a robot apparatus 200 having robot arms 201 and 211 implementing the present invention. The robot arms 201 and 211 may be six-axis (joint) vertical articulated robot arms, for example, and each of the joints thereof may be controlled to a desired position/attitude by performing servo control over a servomotor provided in the joint.

Operations of the robot arms 201 and 211 are controlled by robot control devices 202 and 212, respectively. Teaching pendants (TPs) 203 and 213 are connected to the robot control devices 202 and 212, respectively. Operations of the arms may be programmed through manual operations on the TPs 203 and 213 connected to the robot control devices 202 and 212. For example, an operation for moving reference positions (such as tool mount planes at tips) of the robot arms 201 and 211 through desired paths may be programmed by sequentially designating teaching points on the path by using the TPs 203 and 213. Such a teaching point may be designated through an operation for moving an arm from a present position/attitude as a result of a manual operation on the TPs 203 and 213, for example.

Each of the TPs 203 and 213 may have a changing switch for switching between a state that a manual operation for teaching a corresponding one of the robot arms 201 and 211 is enabled and a state that automatic driving based on teaching data is performed, for example. Each of the TPs 203 and 213 has a teaching mode instruction switch for shifting a corresponding one of the robot arms 201 and 211 to a teaching mode. Each of the TPs 203 and 213 has an operation instruction switch for displaying an operation instruction for a teaching operation on a display, for example, provided on a corresponding one of the TPs 203 and 213.

Figure 2:
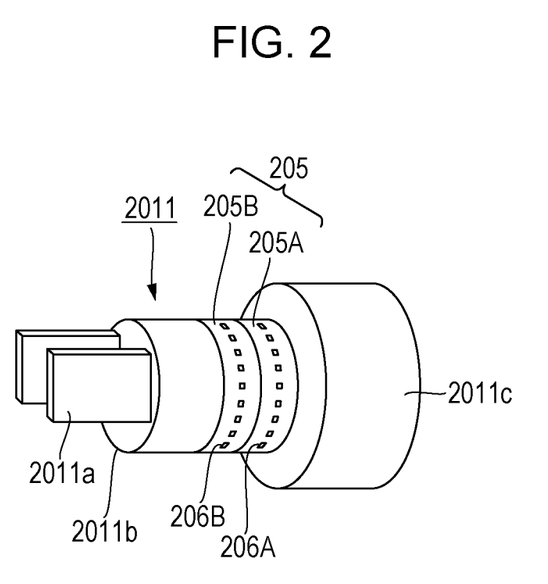
FIG. 2 is a perspective view illustrating a configuration example of an indicator provided at a tip of a robot arm of the robot apparatus in FIG. 1.

The robot arms 201 and 211 may be six-degree of freedom manipulators each having six rotary joints, for example. Each of the robot arms 201 and 211 has a gripper as illustrated in FIG. 2 at its tip part as a tool for grasping a work to be operated. FIG. 2 illustrates a structure around a gripper 2011 provided at a tip of the robot arm 201. The robot arm 211 also has a similarly configured gripper at its tip.

The gripper 2011 in FIG. 2 has a finger 2011a for handling a work at a gripper tip 2011b. The illustrated gripper 2011 has a gripper tip 2011b having a substantially cylindrical cross-section and a gripper base 2011c, and an actuator configured to open and close the fingers 2011a is provided within them. The actuator configured to open and close the fingers 2011a may be any arbitrary actuator such as pneumatic and hydraulic actuators as well as a motor and a solenoid. The gripper 2011 is mounted at a tip of a robot arm for the purpose of carrying in and out a work to a working area or assembling a grasped work into a different work.

The gripper tip 2011b and finger 2011a being action units of the gripper 2011 are pivotably supported about a tool mounted surface of the robot arm 201. The gripper tip 2011b and finger 2011a may be driven to pivot by a servomotor internally provided in the gripper base 2011c, for example. Alternatively, a driving source for the pivoting may be provided on a tool-mounted side of the robot arm 201.

As illustrated in FIG. 2, according to this embodiment, the gripper 2011 of the robot arm 201 has an indication device 205 having indicators 205A and 205B as an operability indication unit.

The indicators 205A and 205B may include a plurality of LEDs 206A and 206B arranged with a predetermined space therebetween and a ring-shaped scattering plate covering those LEDs, for example. When one or more of the LEDs 206A or 206B is driven to light up or flash, light is scattered externally by the scattering plate covering the LEDs. According to this embodiment, in this structure as described above, indication surfaces of the indicators 205A and 205B are provided on all circumference of the gripper tip 2011b.

Therefore, for example, in a case where two operators, e.g. a manipulator and a supervisor, as described above, perform teaching operations, the supervisor in particular is allowed to easily visually recognize the indication states of the indication device 205 at any position in the vicinity of the robot arm 201. The visible easiness of the indication device 205 does not vary even when joints of the robot arm 201 are controlled to any attitude, or when the gripper tip 2011b and finger 2011a are driven to pivot in any manner.

The indication device 205 may be positioned on a circumference of the gripper base 2011c. The indication device 205 may be provided at any position where the indication device 205 may be easily visually recognized during a teaching operation and may be provided on the robot arm 201 instead of on the gripper 2011, without greatly requiring visible easiness for an operator (especially a supervisor). For example, the indication device 205 may be provided at a position close to the tip of the robot arm 201.

According to this embodiment, the structures of the gripper and indication devices in FIG. 2 are provided on the robot arm 211 in FIG. 1. To avoid complexity in FIG. 1, reference numerals relating to the gripper are omitted. For example, an indication device 215 having indicators 215A and 215B are only illustrated on the robot arm 211 in FIG. 1 where it has an equivalent configuration to that of the indication device 205 provided on the gripper.

According to this embodiment, the indicators 205A, 205B, 215A, and 215B of the indication devices 205 and 215 are usable for indicating states, especially operability states, of the robot arms 201 and 211. The indicators 205A and 205B on the robot arm 201 and the indicators 215A and 215B on the robot arm 211 are placed adjacent to each other such that the indications may be checked simultaneously as illustrated in FIGS. 1 and 2.

Each of the first indicators 205B and 215B of the arms is used for indicating a state of an arm different from the arm where the indicator is provided, while each of the second indicators 205A and 215A is used for indicating a state of the arm where the indicator is provided. The different usages of the indicators may allow an operator (especially a supervisor) to watch the tip of one arm to visually recognize not only the state of the arms but also the state of an arm different from the one arm at the same time.

For example, each (first indicator) of the indicator 205B of the robot arm 201 and the indicator 215B of the robot arm 211 is used for indicating a state of the corresponding one of the robot arm 211 and robot arm 201 different from the arm where the indicator is provided.

Each (second indicator) of the indicator 205A of the robot arm 201 and the indicator 215A of the robot arm 211 is used for indicating a state of the corresponding one of the robot arm 201 and robot arm 211 where the indicator is provided.

For example, when the robot arm 201 is changed to the teaching mode in response to a manipulation on the TP 203, the indicator 205A of the robot arm 201 and the indicator 215B of the robot arm 211 are turned on (or lighted). When the robot arm 211 is changed to the teaching mode in response to a manipulation on the TP 213, the indicator 215A of the robot arm 211 and the indicator 205B of the robot arm 201 is turned on. When both of the robot arms 201 and 211 are not in the teaching mode, all of the indicators are turned off (not lighted). Such indication control may be implemented through indication control devices 204A, 204B, 214A, and 214B, which will be described below.

The robot control devices 202 and 212 configured to control the robot arms 201 and 211 may be connected to a LAN 230, for example. The LAN 230 is a local area network configured based on IEEE-802.3 standard or other network standard, for example. In the robot apparatus according to this embodiment, information regarding states, especially operability states, of the robot arms 201 and 211 is network-shared over the LAN 230. Based on the shared operability states, indications of the indicators 205A, 205B, 215A, and 215B are controlled through the indication control devices 204A, 204B, 214A, and 214B. The information regarding the operability states may be shared by accessing a shared memory space in a Programmable Logic Controller (PLC), not illustrated, connected to the LAN 230 by the robot control devices 202 and 212, for example. Alternatively, the information sharing may be allowed by exchange of packet storing information corresponding to the operability states of the arms between the robot control device or over the LAN 230 when the operability state of at least one of the robot arms changes or intermittently. The access to a shared memory space and packet exchange as described above may apply any arbitrary network protocol as required.

Next, steps for controlling lighting of the indicators performed by the robot control devices 202 and 212 through the indication control devices 204A, 204B, 214A, and 214B will be described in detail. As described above, the robot control devices 202 and 212 are connected to the LAN 230 and are thus allowed to share information (or control information) regarding states of the corresponding robot arms.

The indication control devices 204A and 204B of the robot control device 202 in FIG. 1 control indications of the indicators 205A and 205B, respectively. The indication control devices 214A and 214B of the robot control device 212 control indications of the indicator 215A, 215B, respectively. Signal lines between these indication control devices and indicators are provided within the robot arms 201 and 211, for example, as indicated by the broken lines in FIG. 1.

The indication control device 204A of the robot arm 201 controls the indication of the indicator 205A in accordance with the operability state of the robot arm 201 as described above. On the other hand, the indication control device 204B of the robot arm 201 controls the indication of the indicator 205B in accordance with the operability state of the robot arm 211 different from the robot arm 201. Thus, the indication control device 204A of the robot arm 201 receives a signal regarding the operability state of the robot arm 201 from the control device 202 and controls the indication of the indicator 205A. The indication control device 204B of the same arm receives a signal regarding the operability state of the robot arm 211 transmitted through the LAN 230 and controls the indication of the indicator 205B.

The indication control device 214A of the robot arm 211 controls the indication of the indicator 215A in accordance with the operability state of the robot arm 211 as described above. On the other hand, the indication control device 214B of the robot arm 211 controls the indication of the indicator 215B in accordance with the operability state of the robot arm 201 different from the robot arm 211. Thus, the indication control device 214A of the robot arm 211 receives a signal regarding the operability state of the robot arm 211 from the control device 212 and controls the indication of the indicator 215A. The indication control device 214B of the same arm receives a signal regarding the operability state of the robot arm 201 transmitted through the LAN 230 and controls the indication of the indicator 215B.

The signals for controlling the indication of the indicators by the indication control devices 204A, 204B, 214A, and 214B in accordance with the operability states thereof may be servo signals for controlling servomotors in the joints of the robot arms 201 and 211, for example. For example, in the teaching mode of one robot arm, all joints of the robot arm may be operated in accordance with a manual operation on the corresponding teaching pendant. For the operation, servomotors of the joints of the corresponding arm are turned on/off (enable/disable) collectively in many cases. Therefore, for example, the signals for controlling the indication of the indicators by the indication control devices in accordance with the operability states thereof may be servo signals (or servo control signals such as so-called servo ON signals) for controlling one (or all) of the servomotors of the joints.

According to this embodiment, it is assumed in the following descriptions that the signals for controlling the indication of the indicators by the indication control devices 204A, 204B, 214A, and 214B in accordance with the operability states thereof are servo control signals. In this case, the indication control devices 204A, 204B, 214A, and 214B may be duty ratio (alternatively or further voltage/current) conversion circuits, for example, configured to convert a servo control signal to an indication drive signal which may be input to the indicators of the indication devices 205 and 215.

Figure 8:
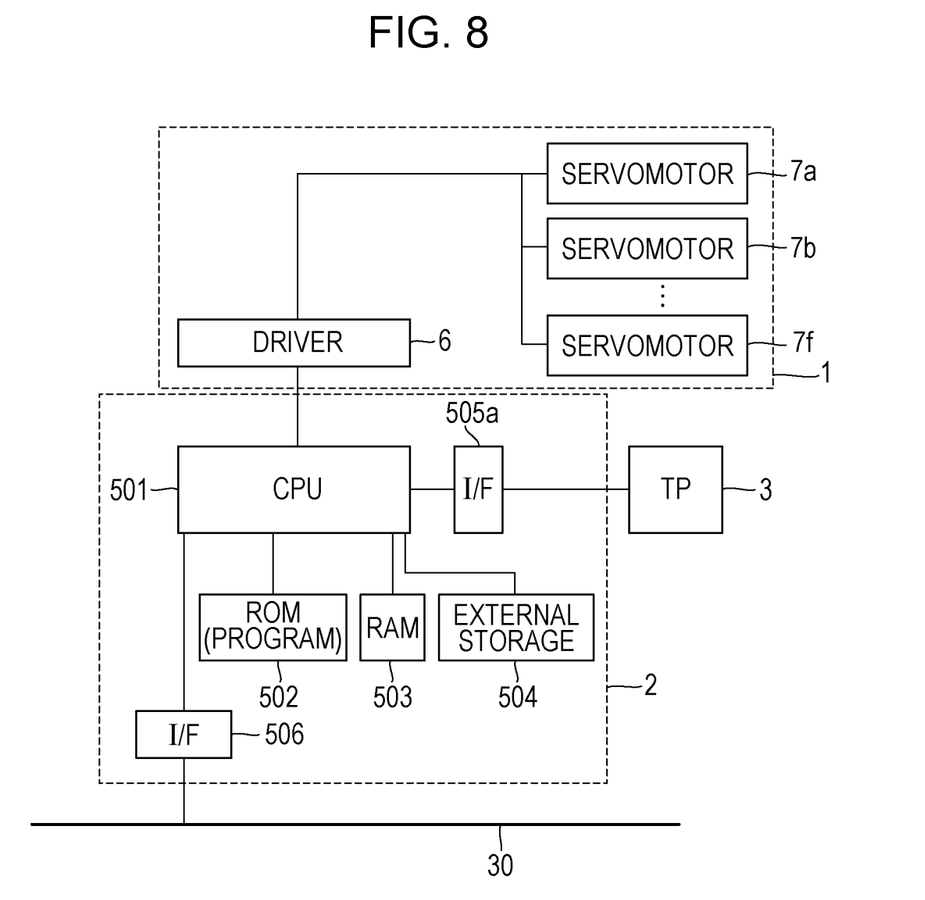
FIG. 8 is a block diagram illustrating a configuration of a robot control device applied in the robot apparatus in FIG. 1.

FIG. 8 illustrates a fundamental configuration of the control system including the robot control device 202 (or 212), robot arm 201 (or 211), and TP 203 (or 213) in FIG. 1. The control system in FIG. 8 includes a robot control device 2, a robot arm 1, and a TP 3. The robot control device 2 and robot arm 1 in FIG. 8 correspond to the robot control device 202 (or 212) and robot arm 201 (or 211) in FIG. 1, and the TP 3 in FIG. 8 corresponds to the TP 203 (or 213) in FIG. 1. FIG. 8 illustrates a LAN 30 as a network corresponding to the LAN 230 in FIG. 1.

FIG. 8 only illustrates the main configurations of the robot control device 2, robot arm 1, and TP 3, and the configurations of the indication system for indication of operability states as described above are omitted (to avoid complexity and improve understanding). The robot arm 1 includes servomotors 7a, 7b, to 7f, and a driver 6 configured to output control data from a CPU 501 to the servomotors 7a, 7b, to 7f.

A main control unit of the robot control device 2 includes a CPU 501 configured by a general-purpose microprocessor, for example. A ROM 502 storing a program for general control of the robot apparatus, and a RAM 503 usable as a work area for the CPU 501 are connected to the CPU 501. An external storage device 504 may be provided as a storage device usable for input/output of control data. The external storage device 504 may be a (removable) HDD, SSD, or flash memory, for example, and may be used for input/output of teaching (programming) data for the robot arm 1 and control data for updating a program in the ROM 502. The components above are connected via an internal bus, not illustrated. The CPU 501 is capable of communicating with the TP 3 through an interface circuit 505a configured based on an arbitrary interface standard to receive input of an operation state of the TP 3. The CPU 501 communicates with the LAN 30 through an interface circuit 506 configured based on the network standard and shares information regarding states of robot arms as described above through the LAN 30.

Indication control in the aforementioned configuration will be described with reference to FIGS. 3A to 3D. Here, indication control over the indication device 205 (robot arm 201) and indication device 215 (robot arm 211) will be described, for example, in a case where the robot arm 201 is subject to a teaching operation.

Figure 3A:
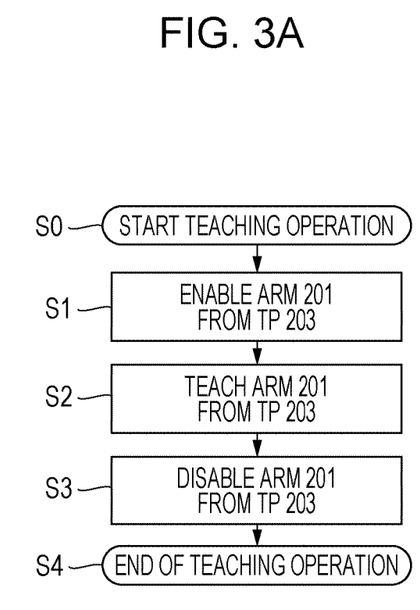
FIG. 3A is a flowchart of indication control relating to a teaching operation.

FIG. 3A illustrates a flow (step S0 to S4) of control in a case where a manual teaching operation is performed on the robot arm 201. FIG. 3A mainly illustrates operations principally from the TP 203. The control over the components of the robot arm 201 in response to operations in steps (S0 to S4) is executed by the CPU 501 (FIG. 8) in the robot control device 202. A control program to be executed by the CPU 501 therefor may be stored in the ROM 502 in FIG. 8, for example.

Figure 3B:
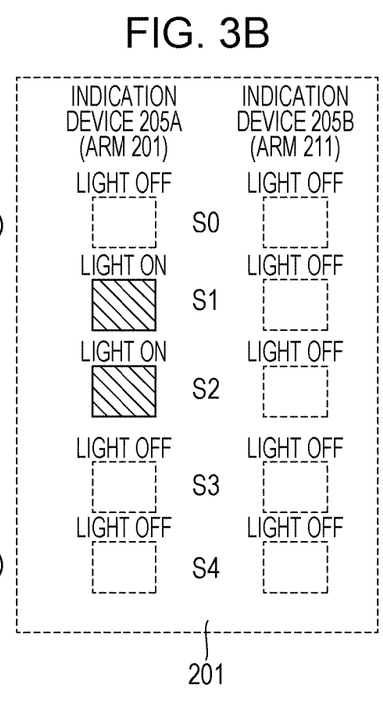
FIGS. 3B and 3C are explanatory diagrams illustrating indication states of an indicator in steps of the indication control.
Figure 3C:
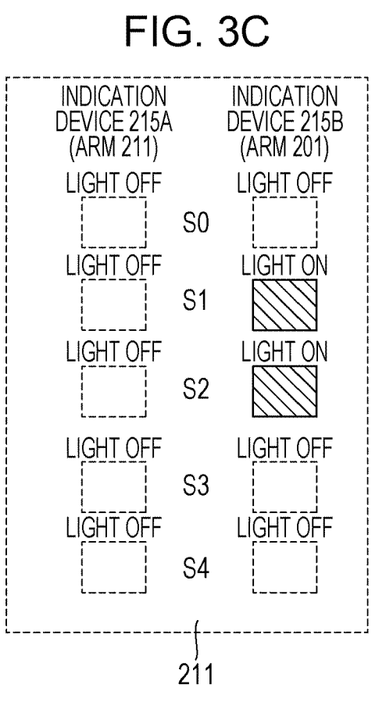

FIGS. 3B and 3C illustrate indication states of the indication devices 205 and 215 on the robot arms 201 and 211 in correspondence with the steps (step S0 to S4) in FIG. 3A. The lighting states of the indicators 205A, 205B, 215A, and 215B in the indication devices 205 and 215 are indicated by broken lines.

Figure 3D:
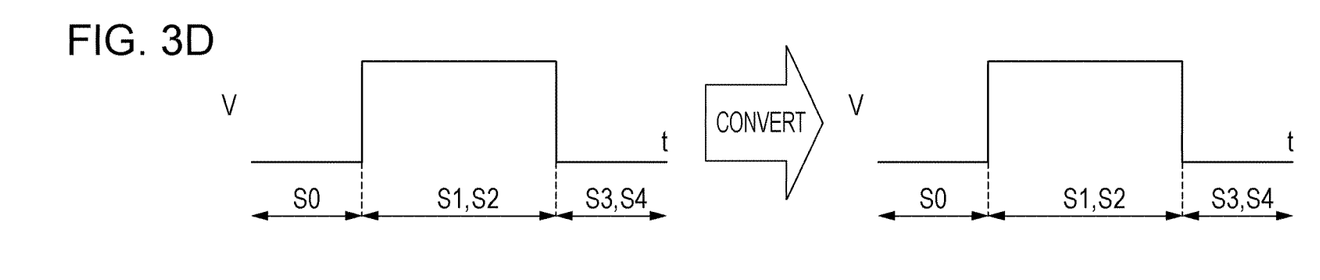
FIG. 3D is an explanatory diagram illustrating indication control signals used in the indication control.

FIG. 3D illustrates changes of a servo control signal (left side) and an indication drive signal (right side) in steps S0 to S4 in FIG. 3A. According to this embodiment, the indication states of the indicators in the indication devices 205 and 215 are acquired by generating indication drive signals by the indication control devices 204A, 204B, 214A, and 214B, for example, based on servo control signals that vary in accordance with the teaching operations in FIG. 3A. In a case where a servo control signal is used as in this embodiment, when a robot arm is controlled into a teaching mode, the servo control signal for the arm is controlled into a servo ON state. With such signal changes, the duty ratio conversion (or timing conversion) in the indication control devices 204A, 204B, 214A, and 214B is basically not necessary as illustrated in FIG. 3D. These indication control devices 204A, 204B, 214A, and 214B may be configured to perform a necessary voltage or current conversion, for example.

Upon start of a teaching operation in FIG. 3A (step S0), no teaching operation has been performed yet. Thus, servo control signals for the robot arms 201 and 211 are servo OFF. As illustrated in FIGS. 3B and 3C, all indicators 205A, 205B, 215A, and 215B on the robot arms 201 and 211 have a light-off state.

Next, an operator performing the teaching operation changes the robot arm 201 to the teaching mode from the TP 203 (step S1). In response to the change, the robot control device 202 changes the servo control signal for the arm to a servo ON state in order to shift the robot arm 201 to the teaching mode. Thus, the indicator 205A is turned on (light-on state) through the indication control device 204A.

Because states of the arms are shared through the LAN 230 as described above, the teaching mode (such as a state of the servo control signal) of the robot arm 201 is transmitted to the robot control device 212 in the robot arm 211 through the LAN 230. The robot control device 212 supplies a signal based on the servo control signal of the robot arm 201 to the indication control device 214B to generate an indication drive signal and thus turn on (light-on state) indicator 215B. On the other hand, the robot arm 211 here is not in the teaching mode and has a servo OFF state. Through the reverse control steps to the steps above, the indicator 205B and indicator 215A are controlled into a light-off state (the same is true below).

While the teaching operation is being performed with the TP 203 (step S2), the robot control device 202 holds the servo control signal for the robot arm 201 in a servo ON state through the indication control device 204A, and the indicator 205A keeps its light-on state. Because this state is continuously being transmitted to the robot control device 212, the indicator 215B keeps its light-on state through the indication control device 214B. Because the robot arm 211 has not been shifted to the teaching mode yet and has a servo OFF, the indicator 205B and indicator 215A keep their light-off states through the reverse control steps to the steps described above.

When the teaching operation ends and the operator disables the robot arm 201 from the TP 203 (step S3), the robot control device 202 changes the servo control signal to a servo OFF state. In response to this, the indicator 205A is turned off (light-off state) through the indication control device 204A. Because this state is continuously transmitted to the robot control device 212, the indicator 215B is turned off (light-off state) through the indication control device 214B. The indicators 205B and 215A still have a light-off state. At the end of the teaching operation (step S4), all of the indicators hold their light-off state.

The example has been described in which the robot arm 201 is controlled into the teaching mode in response to a teaching operation. However, in a case where the robot arm 211 is controlled into the teaching mode, indication states at that time may be illustrated by replacing the reference signs of the indicators in FIGS. 3B and 3C by each other.

As described above, according to this embodiment, the indication devices 205 and 215 each having an indicator configured to indicate a state of an arm and an indicator configured to indicate a state of an arm different from the arm are provided near tips of the juxtaposed robot arms 201 and 211. The indicators 205A, 205B, 215A, and 215B in the indication devices 205 and 215 may be easily visually recognized especially by a supervisor without requiring to move his or her line of sight greatly. Therefore, the supervisor is allowed to easily and simultaneously check not only a robot arm that he or she is gazing at but also a state, especially an operability state, of the other juxtaposed arm. Thus, even when a manipulator switches a robot arm different from a robot arm being gazed at by a supervisor into the teaching mode through the TPs 203 and 213 without signaling, the supervisor is allowed to immediately recognize the switching. Therefore, the supervisor may take a necessary measure such as performing an avoiding behavior and may concentrate on a job without anxiety. Furthermore, an advantageous effect is also provided that states of the robot arms may be checked highly efficiently for smooth job handling.

According to this embodiment, indication surfaces of the indication devices 205 and 215 each including an indicator configured to indicate a state of the specific arm, and an indicator configured to indicate a state of another arm different from the specific arm, are provided substantially on all circumference of a tip part of the robot arm. This structure may be implemented by ring-shaped indication surfaces of the indication devices 205 and 215 as illustrated in FIG. 2. This structure allows a supervisor in particular to easily visually recognize an indication state of the indication device 205 at any position near the robot arm 201. The structure does not change even when joints of the robot arm 201 are controlled into any attitudes and even when the gripper tip 2011b and finger 2011a are driven to pivot in any manner. Thus, irrespective of any operation state and job state of the robot apparatus, an operator is allowed to check the state of the specific arm, and the state of another arm different from the specific arm, with high visibility and to smoothly and efficiently execute teaching operations on the robot apparatus without anxiety.

Having described that two robot arms are juxtaposed, the configuration of the present invention may be implemented also in a configuration that three or more robot arms are juxtaposed. In that case, an indication device (such as the indication device 205) provided at one robot arm may include an indicator which indicates a state of the arm (the indicator 205A) and indicators which indicates states of the other arms different from the arm where the number of the indicators is equal to the number of arms. For example, the indication device 205 includes the indicator 205A which indicates a state of the arm and indicators 205B, 205C, 205D . . . which indicate states of the other arms different from the arm. Also in this configuration, sharing information regarding states of the robot arms juxtaposed over a network, for example, as described above allows an indication device at a tip part of one specific arm thereof to indicate states of the other arms different from the specific arm.

The case has been described above in which two robot arms 201 and 211 are juxtaposed, and the robot control devices 202 and 212 and the TPs 203 and 213 are provided therefor, respectively. However, the configuration in which the indication devices 205 and 215 having an indicator which indicates a state of one arm, and an indicator which indicates a state of another arm different from the arm, are provided in a tip part of a specific arm may be implemented independently of the arrangement of the robot control devices and TPs.

For example, the configuration of the present invention may also be implemented in a configuration in which one group of robot control devices and TPs is provided for two robot arms and a teaching operation is performed on the arms by using a switch for switching a target of the teaching operation. In this case, the indication state of one indicator in the indication devices 205 and 215 may be changed in accordance with the selection state of the target arm of a teaching operation which is controlled by operating the switch for changing the teaching operation target. In other words, the indication state of an indicator in the indication devices 205 and 215 on an arm selected (or unselected) as a teaching operation target may be caused to flash or change its indication color. Under this control, an operator is allowed to grasp, securely and in a stepwise manner, states from a change of the teaching operation target to a shift of a specific arm into the teaching mode.

As illustrated in FIG. 1, in a case where two (or more) robot arms are juxtaposed and are controlled so as to perform a specific job process, such a robot arm arrangement unit may sometimes be called a "cell unit". A unit having a plurality of such cell units adjacent to each other may sometimes be called a "station". In the robot apparatus illustrated in FIG. 1, the robot arms 201 and 211 may be arranged to be configured as one cell unit as described above and may be taught to perform some type of assembly or processing steps, for example. On the other hand, one characteristic of the present invention is that an indication device (205, 215) has an indicator (205B, 215B . . . ) capable of indicating a state of a robot arm different from an arm where the indication device is provided. The indicator (205B, 215B . . . ) is not always required to indicate a state of a different arm included in the same arrangement unit such as a cell unit and a station. For example, the indicator (205B, 215B . . . ) which indicates a state of a different robot arm may be configured to indicate a state of an arm included in a different cell unit or station from the one to which the arm belongs, whether the arms are adjacent or are separated or not.

Having described above that each of the indication surfaces of the indication devices 205 and 215 are provided substantially on all the circumference of a tip part of a robot arm, they may be provided on a surface (only) where an operator may visually recognize most in accordance with, for example, a typical standing position of the operator. The indication devices 205 and 215, for example, may be provided over a half circumference of an inner side (or outer side) of a robot arm from the viewpoint of a manipulator or a supervisor at a typical standing position.

In other words, the indication surfaces of the indication devices 205 and 215 may be provided over at least substantially half (or more) of the circumference of one side of a tip part of the robot arms. This achieves a major part of the operation effect that an operator may easily grasp states of a robot arm, and a robot arm different from the arm irrespective of the position/attitude of the robot arm.

The configuration has been described in which the indication devices 205 and 215 are provided on the gripper 201I provided as a tool for handling an object in a tip part of a robot arm. However, the tool having the indication devices 205 and 215 is not limited to such a gripper (hand), but indication devices equivalent to the indication devices 205 and 215 may be provided on any arbitrary tool (or end effector) provided in a robot arm. Indication devices equivalent to the indication devices 205 and 215 may not have to be provided on a tool or an end effector but may be provided on one link configured near a tip part of a robot arm, for example.

Second Embodiment

According to the first embodiment, a servo control signal may be used for indicating states of robot arms by the indication devices 205 and 215. However, other signals usable in a robot apparatus may be used for indication of states of robot arms. According to a second embodiment, a brake drive signal which drives a brake for controlling an operation of a joint of a robot arm may be used to generate an indication drive signal for an indication device, for example.

A robot arm may have a brake at a driving axis of a servomotor for each rotary joint as a drive unit for maintaining the joint at its position against gravity when a driving power supply for the servomotor for each rotary joint is shut down. This type of brake may be a released-on-excitation type brake, for example. The released-on-excitation type brake operates to brake and hold an output axis of a servomotor without excitation, and releases the output axis of the servomotor with excitation. Normally, the brake is unexcited immediately after a robot apparatus is powered on, and a driving axis of a servomotor for a robot arm is therefore braked, and the robot arm is held at its position/attitude. On the other hand, when the robot arm is shifted to a teaching mode, each brake is excited and is driven to release the driving axis of the servomotor for each joint. Thus, states of the joints may be controlled freely from the servomotors.

According to this embodiment, a brake control signal for controlling a brake provided at a joint of the robot arm may be converted to generate an indication drive signal for an indication device which indicates a state of a specific arm, and a state of another arm different from the arm.

Figure 4:
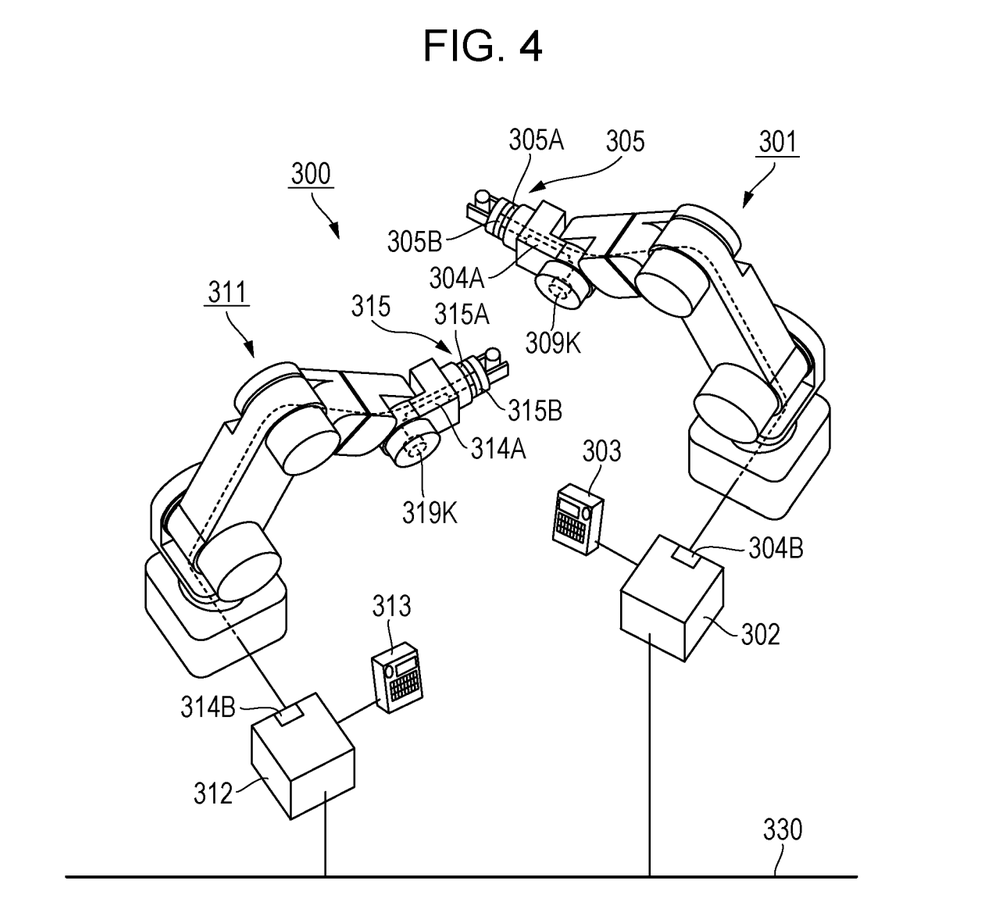
FIG. 4 is an explanatory diagram illustrating a schematic configuration of a robot apparatus according to a second embodiment applying the present invention.
Figure 5:
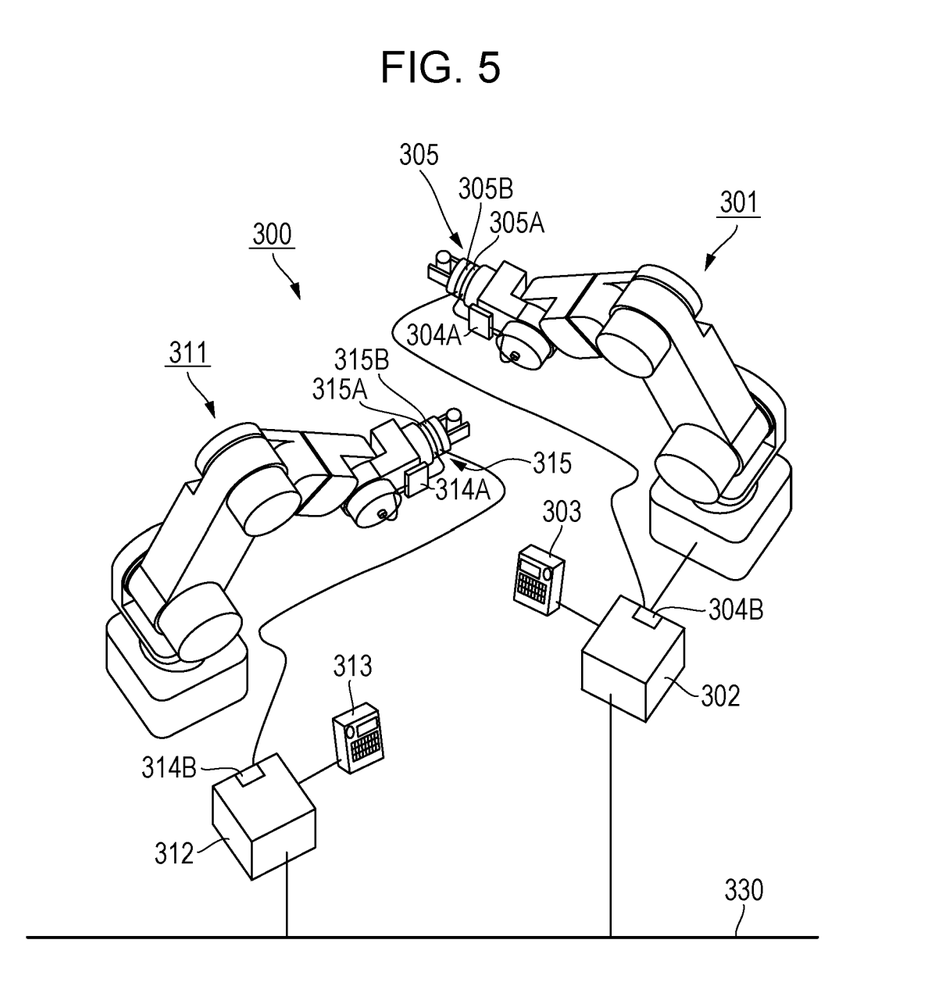
FIG. 5 is an explanatory diagram illustrating a different wiring scheme in a robot apparatus according to the second embodiment applying the present invention.

FIGS. 4 and 5 illustrate a configuration of a robot apparatus according to this embodiment in the same form as that of FIG. 1. FIGS. 4 and 5 are different only in a wiring scheme applied in a control system in an indication device using the brake control signal, and like numbers refer to like parts in FIGS. 4 and 5. Reference numerals of 300s are used in FIGS. 4 and 5 instead of 200s in FIG. 1, and parts referred by numerals having like lower two digits are identical or like parts in FIG. 1 and FIGS. 4 and 5.

A robot apparatus 300 in FIGS. 4 and 5 includes robot arms 301 and 311 which are juxtaposed with each other. Indication devices 305 and 315 corresponding to an operability indication unit include indicators 305A, 305B, 315A, and 315B placed at equivalent positions to those in FIG. 1 in tip parts of the robot arms 301 and 311. The configuration around a gripper having the indication devices 305 and 315 is substantially the same as the one illustrated in FIG. 2, and the arrangement structure of the indicators 305A, 305B, 315A, and 315B may be the same as the indicators 205A, 205B, 215A, 215B in FIGS. 1 and 2.

Also in the configuration in FIGS. 4 and 5, the robot arms 301 and 311 have respectively corresponding robot control devices 302 and 312, and TPs 303 and 313 are connected to the corresponding robot control devices.

The indication control over the indicators 305A, 305B, 315A, and 315B in the indication devices 305 and 315 are performed by the indication control devices 304A, 304B, 314A, and 314B. According to this embodiment, the indicators 305A and 315A which indicate a state of an arm having the indication device 305 or 315 are controlled by indication control devices 304A and 314A.

Referring to FIGS. 4 and 5, the indication control devices 304A and 314A convert brake control signals for brakes 309K and 319K (one of which provided in one joint of the arms is only illustrated) to indication drive signals for the indicators 305A and 315A. The brake control signals are extracted from brakes 309K and 319K provided in joints close to tips of the robot arms 301 and 311.

In FIG. 4, the extracted brake control signals are connected to the indication control devices 304A and 314A provided within the robot arms 301 and 311. On the other hand, referring to FIG. 5, brake control signals are derived from brakes provided in joints close to tips of the robot arms 301 and 311 to outside of the joints and are connected to the indication control devices 304A and 314A provided outside of the link of the robot arms 301 and 311. The wires from the indication control devices 304A and 314A to the indicators 305A and 315A are connected through arms in FIG. 4 and through outside of the arms in FIG. 5. FIG. 4 and FIG. 5 are different in the layout of the indication control devices 304A and 314A and the wiring.

The indication control devices 304B and 314B which perform indication control over the indicators 305B and 315B in the indication devices 305 and 315 are provided closely to the robot control devices 302 and 312 like the indication control devices 204B and 214B in FIG. 1.

The robot control devices 302 and 312 may be configured in the same manner as those illustrated in FIG. 8 as described above. Information regarding states of the robot arms is shared through a LAN 330 like the first embodiment. For example, states of brake control signals for the brakes 309K and 319K (FIG. 4) may be shared through the LAN 330, and the indication control devices 204B and 214B perform indication control over the indicators 305B and 315B in accordance with the shared state of the brake control signal for the other arm.

Figure 6:
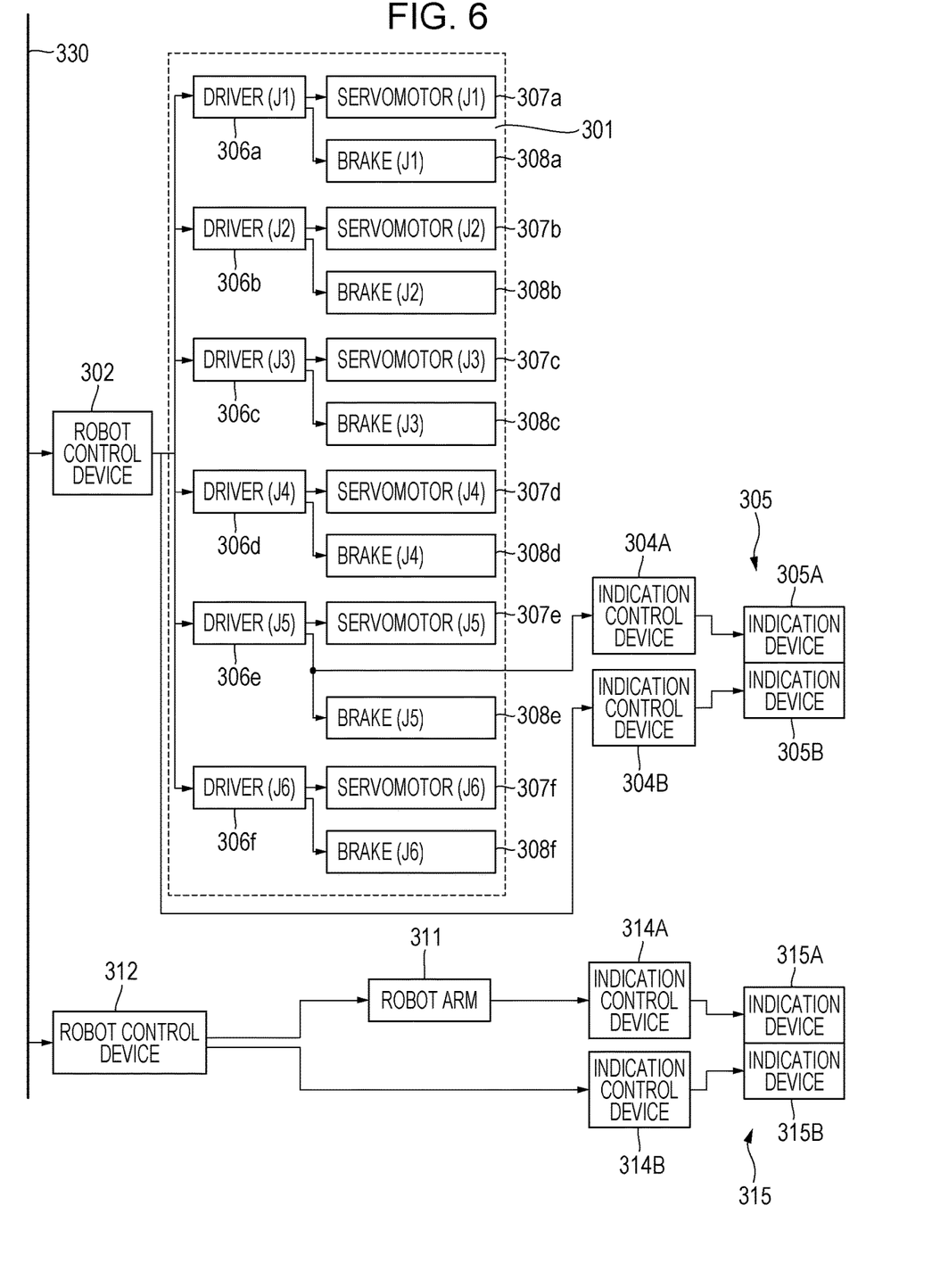
FIG. 6 is a signal block diagram illustrating detail configurations of a driving control system and an indication control system in the robot apparatus according to the second embodiment applying the present invention.

FIG. 6 is a block diagram illustrating a configuration of an indication control system applying the brake control signals. The robot arm 301 in FIG. 6 includes servomotors 307a to 307f for six joints (six axes: J1 to J6), and operations of the servomotors are controlled by the robot control device 302 through the driver 306a to 306f, respectively. A brake 308a operates to brake and hold an output axis of a servomotor 307a. A brake 308b operates to brake and hold an output axis of a servomotor 307b. A brake 308c operates to brake and hold an output axis of a servomotor 307c. A brake 308d operates to brake and hold an output axis of a servomotor 307d. A brake 308f operates to brake and hold an output axis of a servomotor 307f.

A brake 308e in FIG. 6 corresponds to the brake 309K in FIG. 4. A brake control signal for the brake 308e is input to the indication control device 304A and is converted to an indication drive signal for the indicator 305A. A state of the brake control signal is shared through the LAN 330 and is input to the indication control device 304B through the robot control device 302. The robot arm 311 side, not illustrated in FIG. 6 has the same configuration as that of the robot arm 301 side.

FIGS. 7A to 7D illustrate indication control in the configuration in the same manner as in FIG. 3 according to the first embodiment.

Figure 7A:
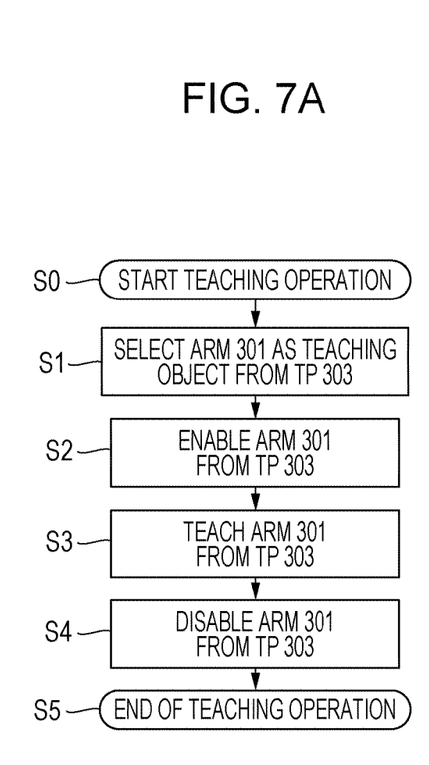
FIG. 7A is a flowchart of indication control relating to a teaching operation.

FIG. 7A illustrates a flow (step S0 to S5) of control for performing a manual teaching operation on the robot arm 301. FIG. 7A principally illustrates an operation from the TP 303. Control over the components of the robot arm 301 in accordance with the steps (S0 to S5) of the operation is executed by a CPU 501 (FIG. 8) in the robot control device 302. A control program for the CPU 501 therefor may be prestored in a ROM 502 in FIG. 8, for example.

Figure 7B:
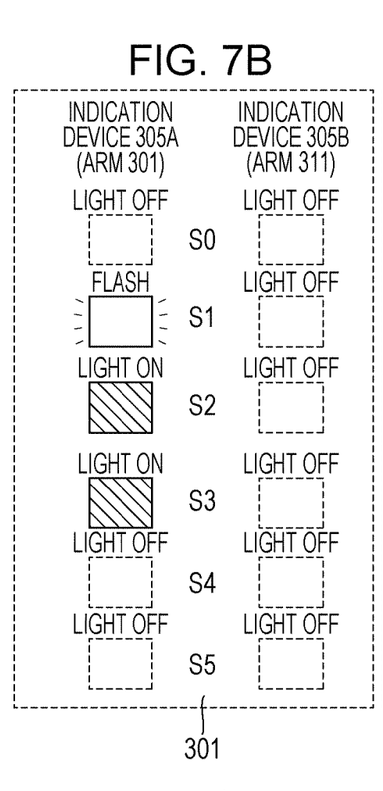
FIGS. 7B and 7C are explanatory diagrams illustrating indication states of an indicator in steps of the indication control.
Figure 7C:
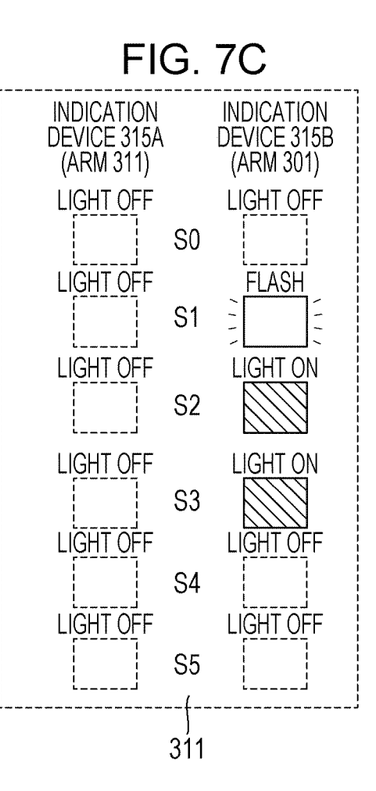

FIGS. 7B and 7C illustrate indication states of the indication devices 305 and 315 on the robot arms 301 and 311 corresponding to the steps (step S0 to S5) in FIG. 7A. In FIGS. 7B and 7C, light-on and flashing states are illustrated by using a shaded pattern and so on for the indicators 305A, 305B, 315A, 315B in the indication devices 305 and 315.

Figure 7D:
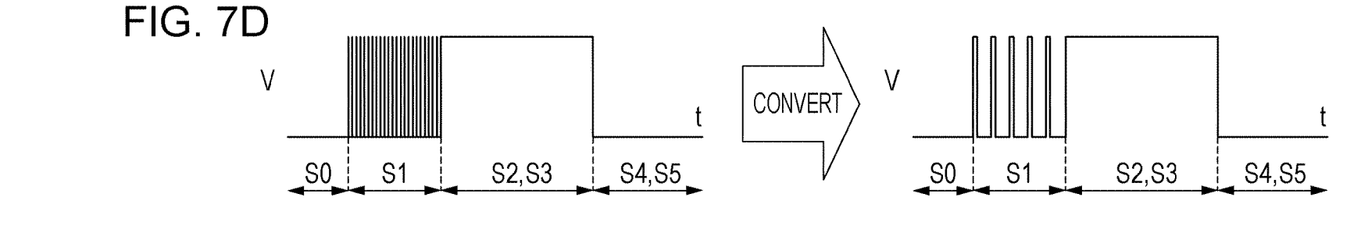
FIG. 7D is an explanatory diagram illustrating indication control signals used in the indication control.

FIG. 7D illustrates changes of a brake control signal (left side) and an indication drive signal (right side) in steps S0 to S5 in FIG. 7A. According to this embodiment, the indication states of the indicators in the indication devices 305 and 315 are acquired by generating indication drive signals by the indication control devices 304A, 304B, 314A, and 314B, for example, based on brake control signals that vary in accordance with the teaching operations in FIG. 7A.

According to this embodiment, as illustrated on the left side of FIG. 7D, when a robot arm is selected as a teaching target through a TP, a brake control signal is changed to a state in which the corresponding brake is energized intermittently. After that, when the robot arm is shifted to the teaching mode, the brake control signal is shifted to an ON state in which the corresponding brake is energized. When an arm is selected as a teaching target, the brake control signal for energizing a brake intermittently has a duty ratio selected such that all of the brakes are not released, for example (such as 1 to several tens KHz).

When a brake control signal exhibits a signal change as described above, the indication control devices 304A, 304B, 314A, and 314B perform a duty ratio conversion based on a division ratio, as illustrated in the left side to the right side of FIG. 7D. As a result of the conversion, in order to indicate that the arm is selected as a teaching target, indication drive signals are acquired which turn the indicators 305A, 305B, 315A, and 315B ON/OFF at a frequency (such as 1 to several Hz) that allows an operator to visually recognize. In this manner, a brake drive signal of pulse width modulated (PWM) waves in a duty ratio region where a brake is not released is frequency converted and is usable as an indication drive signal for flashing.

Referring to FIG. 7A, when a teaching operation starts (step S0), the brake control signals for the robot arms 301 and 311 have a duty ratio of 0%. Here, as illustrated in FIGS. 7B and 7C, all indicators 305A, 305B, 315A, and 315B on the robot arms 301 and 311 are controlled into a light-off state.

Here, when an operator performing the teaching operation selects the robot arm 301 as a teaching target through the TP 303 (step S1), the brake control signal has a duty ratio of 10%. Thus, the brake control signals are converted to indication drive signals through the indication control devices 304A and 314B, and the indicator 305A and indicator 315B start to flash (FIG. 7D). At this point of time, the robot arm 311 is not selected as a teaching target, and the indicator 305B and indicator 315A are controlled so as to keep their light-off states. Similarly to the first embodiment, the indication states of the indicators 305B and 315B are controlled by using brake control signals shared through the LAN 330.

Next, when the operator performs an operation for enabling the robot arm 301 through the TP 303 (step S2), the robot control device 302 in response to it changes the brake control signal for the arm to an energized state with a duty ratio of 100%. Thus, brakes for the robot arm 301 are changed to a release state. With the indication drive signals generated by converting the brake control signals by the indication control device 304A, 314B, the indicators 305A and 315B change their indication states from flashing to lighting up (light on state). The indicators 305B and 315A are still controlled so as to keep their light off states.

While a manipulator is performing a teaching operation on the arm 301 through the TP 303 (step S3), the brake control signal is kept with a duty ratio of 100%. The indicators 305A and 315B keep their light-on state, and the indicators 305B and 315A keep their light-off state. When the teaching operation ends (steps S4 and S5), the brake control signals return to a duty ratio of 0%, and the indicators 305A, 305B, 315B, and 315A return to a light-off state.

This embodiment also has the same operation effect as that of the first embodiment regarding a structure having an indication device including an indicator which indicates a state of a specific arm and an indicator which indicates a state of another arm different from the specific arm. In addition to the effect of the first embodiment, the following operation effect may also be expected according to this embodiment.

According to the first embodiment, wiring is required for transmitting indication drive signals for the indicators 205A and 215A, which indicate states of the arm on which the indication devices 205 and 215 are provided, to a tip part of the arm through the inside of the robot arms 201 and 211 and inside of the joints. On the other hand, according to this embodiment, brake control signals for controlling brakes in joints of the robot arms 301 and 311 are used to generate indication drive signals for the indicators 305A and 315A which indicate states of the arms on which the indication devices 305 and 315 are provided. Thus, this embodiment may only require wiring of a signal line for brake control signals, or indication drive signals generated by converting the brake control signals, from a part near a joint close to an arm tip part to an arm tip part where the indication devices 305 and 315 are provided, for example. Therefore, at least one of signal lines necessary for indication control over the indication devices 305 and 315 may be shorter than that of the first embodiment.

Particularly, because the indicators 305A and 315A in the indication devices 305 and 315 indicate states of the arms where they are provided, their indications are highly important. According to this embodiment, the possibility of broken signal lines for indicators 305A and 315A whose indication are highly important may be reduced, greatly improving their reliability.

As illustrated in FIG. 5, a signal system for indication control may be provided outside an arm. Referring to FIG. 5, signal lines for the indicators 305A and 315A include brake control signals in leads that leave from joints of arms and are connected to the indication control devices 304A and 314A mounted to one link, from which indication drive signals are transmitted through outside of the arms. The signal lines for indication drive signals transmitted from the indication control devices 304B and 314B to indicators 305B and 315B also extend outside the arms. An indication system which indicates states of an arm on which it is provided, and another arm, may be wired outside of the robot arms for higher ease of maintenance.

The configuration in which a signal system for an indication system, which indicates a state of an arm or another arm, is wired outside the arm as illustrated in FIG. 5 may relatively easily address a case where an indication system is added to a robot apparatus which does not have such an indication system originally. The configuration in which a signal system for an indication system is wired outside of arms, as illustrated in FIG. 5, allows a tool to be detachably mounted to a robot arm, for example, with low constraint regarding connectors and electrodes for a signal system. The configuration in FIG. 5 also allows a tool without an indication system, which indicates a state of an arm where it is provided or another arm, to be detachably mounted, for example, with relatively easier commonness in connector and pin arrangement for a signal system.

Different variations according to the first embodiment may also be implemented in this embodiment.

With the aforementioned distinct configuration according to the present invention, a first indicator provided in a tip part of a robot arm is capable of indicating a state of another robot arm different from the robot arm. Thus, a supervisor concentrating on an operation on the robot arm is allowed to easily recognize a state of the other robot arm simultaneously without moving his or her line of sight. Therefore, according to the present invention, the supervisor is allowed to take a necessary avoiding behavior by easily recognizing a shift to a teaching mode of an arm different from an arm at which he or she is gazing at, for example.

While the present invention has been described with reference to embodiments, it is to be understood that the invention is not limited to the disclosed embodiments. The scope of the following claims is to be accorded the broadest interpretation so as to encompass all such modifications and equivalent structures and functions.

What is claimed is:

1. A robot arm that operates in cooperation with another robot arm, the robot arm comprising:
    a tip part; and
    an indication device provided on the tip part of the robot arm and configured to indicate a state of the another robot arm;
    wherein a plurality of indication devices, including the indication device, is provided around the tip part;
    wherein the plurality of indication devices are provided across at least a half circumference of the tip part.

2. The robot arm according to claim 1,
    wherein the indication device further indicates a state of the robot arm, on which the indication device is provided.

3. The robot arm according to claim 1, further comprising:
    a robot control device configured to control operation of the robot arm;
    wherein another robot control device configured to control operation of the another robot arm is provided for the another robot arm, and
    wherein the robot control device corresponding to the robot arm and the another robot control device corresponding to the another robot arm share information regarding the state of the robot arm and the state of the another robot arm by communicating via a network.

4. The robot arm according to claim 1,
    wherein the state indicated by the indication device is operability as to whether the another robot arm is able to operate or not.

5. The robot arm according to claim 1,
    wherein an indication drive signal for the indication device is generated on a basis of a servo control signal for controlling a servomotor configured to drive a joint of the robot arm corresponding to the indication device.

6. The robot arm according to claim 1,
    wherein an indication drive signal for the indication device is generated on a basis of a brake control signal for controlling a brake configured to restrict operation of a joint of the robot arm corresponding to the indication device.

7. The robot arm according to claim 1,
    wherein the indication device is provided on a tool mounted on the tip part of the robot arm for handling an object.

8. The robot arm according to claim 1,
    wherein the indication device indicates the state of the another robot arm when the robot arm is set to be in a teaching mode.

9. The robot arm according to claim 1,
    wherein the indication device is not provided on a teaching pendant.

10. The robot arm according to claim 1, further comprising:
    a base on which a motor for causing the tip part to rotate is provided;
    wherein the indication device is provided between the tip part and the base.

11. The robot arm according to claim 1,
    wherein the indication devices are arranged at predetermined intervals around the tip part.

12. The robot arm according to claim 2,
    wherein, in the indication device, a portion where a state of the robot arm is indicated and a portion where a state of the another robot arm is indicated are adjacent to each other.

13. The robot arm according to claim 1,
    wherein the plurality of indication devices are provided across an entire circumference of the tip part.

14. An indication device attachable to a tip part of a robot arm or to a tool mounted on the tip part of the robot arm and configured to indicate a state of another robot arm different from the robot arm;
    wherein a plurality of indication devices, including the indication device, is provided around the tip part;
    wherein the plurality of indication devices are provided across at least a half circumference of the tip part.

15. The indication device according to claim 14,
    wherein the indication device further indicates a state of the robot arm, on which the indication device is provided.

16. The indication device according to claim 14,
wherein the indicated state of the another robot arm different from the robot arm is operability as to whether the another robot arm is able to operate or not.

17. A robot system, comprising:
a first robot arm and a second robot arm configured to operate in cooperation with each other;
a first indication device provided on a first tip part of the first robot arm and configured to indicate a state of the second robot arm, the first tip part being configured to rotate in a first rotation direction; and
a second indication device provided on a second tip part of the second robot arm and configured to indicate a state of the first robot arm, the second tip part being configured to rotate in a second rotation direction;
wherein a plurality of first indication devices, including the first indication device, is provided around the first tip part, and
wherein a plurality of second indication devices, including the second indication device, is provided around the second tip part,
wherein the plurality of first indication devices are provided across at least a half circumference of the first tip part, and
wherein the plurality of second indication devices are provided across at least a half circumference of the second tip part.

18. The robot system according to claim 17, further comprising:
a first control device connected to the first robot arm; and
a second control device connected to the second robot arm;
wherein the first control device and the second control device share information regarding the states by communicating via a network.

19. The robot system according to claim 17,
wherein the first indication device indicates the state of the second robot arm when the first robot arm is set to be in a teaching mode.

20. A control method for controlling a robot arm configured to operate in cooperation with another robot arm, the robot arm including a tip part, and an indication device provided on the tip part of the robot arm and configured to indicate a state of the another robot arm, wherein a plurality of indication devices, including the indication device, is provided around the tip part, the control method comprising:
indicating the state of the another robot arm by using the indication device by a control device configured to control the robot arm;
wherein the plurality of indication devices are provided across at least a half circumference of the tip part.

21. A non-transitory computer-readable storage medium storing a control program capable of executing the control method according to claim 20.

* * * * *